United States Patent
Barrenscheen

(10) Patent No.: US 7,898,303 B2
(45) Date of Patent: Mar. 1, 2011

(54) BOOST MECHANISM USING DRIVER CURRENT ADJUSTMENT FOR SWITCHING PHASE IMPROVEMENT

(75) Inventor: Jens Barrenscheen, Munich (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 12/875,824

(22) Filed: Sep. 3, 2010

(65) Prior Publication Data

US 2010/0327946 A1 Dec. 30, 2010

Related U.S. Application Data

(62) Division of application No. 12/261,692, filed on Oct. 30, 2008.

(51) Int. Cl.
*H03K 3/00* (2006.01)
(52) U.S. Cl. .............................. 327/108; 326/82; 326/83
(58) Field of Classification Search ................. 327/108; 326/82, 83
See application file for complete search history.

(56) References Cited

U.S. PATENT DOCUMENTS

| | | | |
|---|---|---|---|
| 5,945,872 A | 8/1999 | Robertson et al. | |
| 6,118,326 A | 9/2000 | Singer et al. | |
| 6,215,329 B1 | 4/2001 | Campardo et al. | |
| 6,310,565 B1 | 10/2001 | Ong et al. | |
| 6,323,697 B1 | 11/2001 | Pavan | |
| 6,559,689 B1 | 5/2003 | Clark | |
| 6,724,239 B2 | 4/2004 | Price et al. | |
| 6,756,623 B2 | 6/2004 | Furuie et al. | |
| 7,142,050 B2 * | 11/2006 | Risbo | 330/10 |
| 7,639,050 B2 * | 12/2009 | Chigira | 327/108 |
| 7,671,660 B2 | 3/2010 | Van Acht et al. | |

* cited by examiner

*Primary Examiner*—Kenneth B. Wells
(74) *Attorney, Agent, or Firm*—Slater & Matsil, L.L.P.

(57) ABSTRACT

System and method for providing a boost current to a switching transistor gate is disclosed. A boost capacitor precharged to a voltage level above a gate-source voltage is coupled to a switching transistor gate at the beginning of a switch-on phase. The boost capacitor is decoupled from the switching transistor gate when a boost capacitor voltage falls below the gate-source voltage and is again precharged to the voltage level above the gate-source voltage. A second-phase resistance is coupled between a supply voltage and the switching transistor gate. The second-phase resistance value is selected based upon a current peak detected in the switching transistor. A switch-off capacitor precharged to a voltage level below the gate-source voltage may be coupled to the switching transistor gate at the beginning of a switch-of phase.

20 Claims, 4 Drawing Sheets

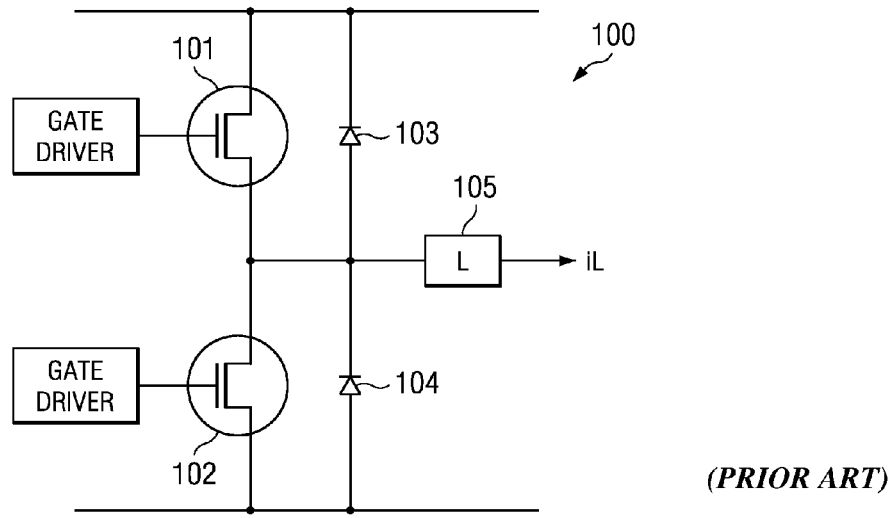
*FIG. 1* *(PRIOR ART)*
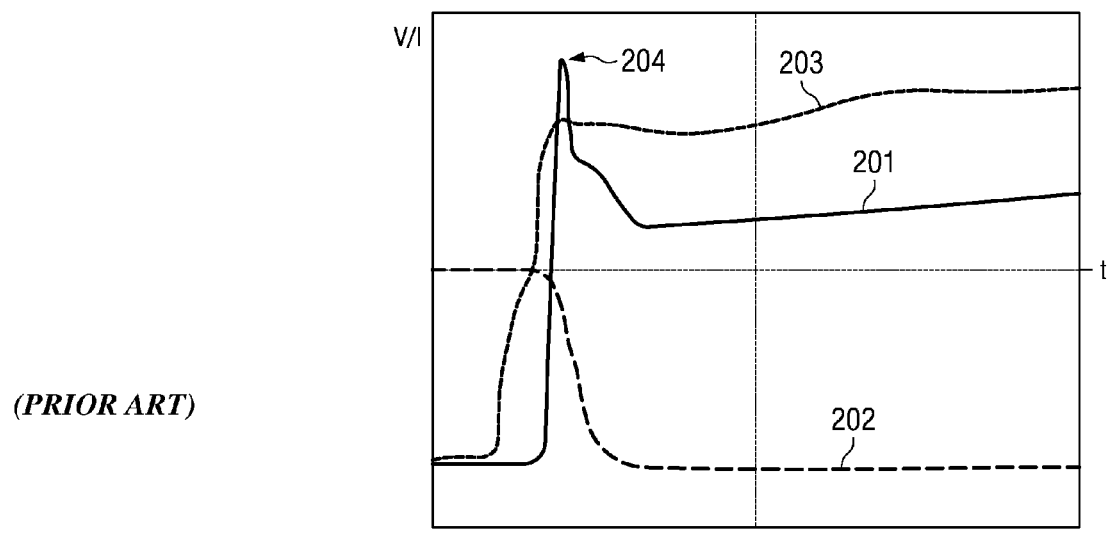
*(PRIOR ART)*
*FIG. 2*

BOOST MECHANISM USING DRIVER CURRENT ADJUSTMENT FOR SWITCHING PHASE IMPROVEMENT

This is a divisional application of U.S. application Ser. No. 12/261,692, entitled "Boost Mechanism Using Driver Current Adjustment for Switching Phase Improvement", which was filed on Oct. 30, 2008 and is incorporated herein by reference.

TECHNICAL FIELD

The present invention relates generally to a system and method for controlling gate current capability of a switching transistor driver and, more particularly, to a system and method for boosting gate current in the commutation phase and for monitoring load current levels to further refine gate current adjustments.

BACKGROUND

In applications with power inverters having free-wheeling diodes, a commonly known negative effect is related to the commutation of the current from a free-wheeling diode to the switching transistor. FIG. 1 illustrates inverter bridge leg circuit 100 with high-side switch 101, low-side switch 102, diodes 103, 104 and load 105. When high-side switch 101 is opened, free-wheeling diode 104 takes over the load current $I_L$. When high-side switch 101 is closed again, such as for the next switching period, a current peak takes place. This current peak results from the fact that diode 104 cannot immediately block the current at the beginning of the commutation phase. As a result, the current peak appears due to a short circuit of the inverter bridge leg. The current peak is related to the time required for diode 104 to get rid of internal charge carriers. It is desirable to lower this current peak as much as possible to reduce switching stress and Electromagnetic Interference (EMI).

High-side switch 101 and low-side switch 102 may be metal-oxide-semiconductor field-effect transistors (MOSFET) or insulated-gate bipolar transistors (IGBT), for example. FIG. 2 illustrates exemplary current and voltage levels across a MOSFET transistor switch during the commutation phase of circuit 100 (FIG. 1). Curve 201 represents the current through high-side switch 101. Curve 202 represents the voltage over high-side switch 101. Curve 203 represents the gate voltage at high-side switch 101 and defines the switching instant.

The gate current is delivered by a gate driver. The slew rate of the current through the high-side switch 101 or the low-side switch 102 is defined using the current when the gate voltage reaches the threshold level just before the Miller plateau (i.e. the start of phase 2 illustrated in FIG. 3). If the gate current is too high, the switch starts conducting very fast and current peak 204 appears. To reduce current peak 204, the gate current at high-side switch 101 (FIG. 1) has to be reduced.

The gate current must be set to a value that fits the actual current load. The load current defines how fast the diode is able to block current. A higher load current results in faster blocking, which reduces the current peak. The easiest way to reduce the gate current is to adapt the gate current driver by adding a series resistance between the output stage of the gate driver and gate of the switch. If the series resistance between the gate driver output state and the gate of the switch transistor is too low, then a current peak will occur. If the series resistance between the gate driver output stage and the switch transistor gate is too high, then the switching will take longer and switching loss will increase. Furthermore, a high series resistance leads to a longer phase 1 (as illustrated in FIG. 3) and in an undesirable switching delay.

One disadvantage of the prior art is that the gate current capability is typically adapted to a nominal load current and cannot be adjusted dynamically. As a result, a current peak is created at lower loads and switching losses appear at higher loads.

SUMMARY OF THE INVENTION

These and other problems are generally solved or circumvented, and technical advantages are generally achieved, by preferred embodiments of the present invention in which a gate driver current is boosted using precharged capacitors in a gate driver circuit and in which peaks in a switching transistor current are minimized by monitoring a current gradient.

In accordance with a preferred embodiment of the present invention, a method for providing a boost current to a switching transistor gate comprises precharging a boost capacitor to a voltage level above a gate-source voltage. The boost capacitor is coupled to a switching transistor gate at the beginning of a switch-on phase and decoupled from the switching transistor gate when a boost capacitor voltage falls to or below the gate-source voltage. The boost capacitor is again precharged to the voltage level above the gate-source voltage after the decoupling step and before a subsequent switch-on phase. A second-phase resistance may be coupled between a supply voltage and the switching transistor gate. The value of the second-phase resistance may selected based upon a desired current level to be applied to the switching transistor gate during the switch-on phase. The second-phase resistance may be coupled between the supply voltage and the switching transistor gate when the boost capacitor is coupled to the switching transistor gate or when the boost capacitor is decoupled from the switching transistor gate. The value of the second-phase resistance may be selected based upon detection of a current peak in the switching transistor, wherein the current peak may be detected by analyzing a negative gradient of a current level in the switching transistor.

A switch-off capacitor may be precharged to a voltage level below the gate-source voltage. The switch-off capacitor is coupled to the switching transistor gate at the beginning of a switch-of phase and decoupled from the switching transistor gate when a switch-off capacitor voltage rises to or above the gate-source voltage. The switch-off capacitor is again precharged to the voltage level below the gate-source voltage after the decoupling step and before a subsequent switch-off phase. A second-phase resistance may be coupled between a supply voltage and the switching transistor gate during a switch-off phase. The value of the second-phase resistance may be selected based upon a desired current level to be applied to the switching transistor gate during the switch-off phase.

In accordance with another embodiment of the present invention, a method of adjusting a gate driver current comprises monitoring a current through a switching transistor to identify a peak current and a load current. A current differential between the peak current and the load current is determined and compared to one or more reference levels. The gate driver current is adjusted based upon the relationship of the current differential to the one or more reference levels. The current differential may correspond to a negative gradient in a current value over time. The results of the comparison step may be filtered before adjusting the gate driver current, such as using a low pass filter or a decimation filter. The gate driver current is decreased if the current differential is above a top reference level. The gate driver current is increased if the current differential is below a lower reference level. The current gate driver current is maintained at a present level if the current differential is between an upper reference level and a lower reference level.

BRIEF DESCRIPTION OF THE DRAWINGS

For a more complete understanding of the present invention, and the advantages thereof, reference is now made to the following descriptions taken in conjunction with the accompanying drawing, in which:

FIG. 1 illustrates inverter bridge leg circuit;

FIG. 2 illustrates exemplary current and voltage levels across a switch transistor during the commutation phase;

DETAILED DESCRIPTION OF ILLUSTRATIVE EMBODIMENTS

The present invention provides many applicable inventive concepts that can be embodied in a wide variety of specific contexts. The specific embodiments discussed are merely illustrative of specific ways to make and use the invention, and do not limit the scope of the invention.

As noted above, one method of adapting a gate driver current is to introduce a series resistance in the driver, thereby limiting the output current capability. Use of a single resistance value is disadvantageous because current peaks are created at lower loads and switching losses appear at higher loads. In one embodiment, several resistance values are implemented in series with the gate driver output. The resistance actually applied to the gate driver may be adapted in steps based upon the actual application needs. However, the use of a series resistance in the gate driver output combined with capacitance in the switching transistor results in low-pass filter behavior.

Figure 3:
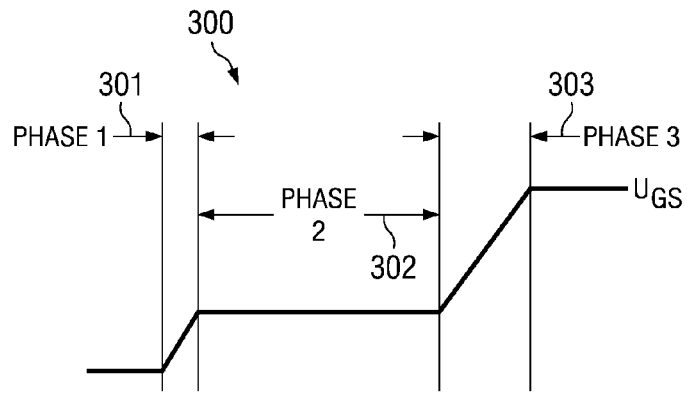
FIG. 3 represents a gate driver voltage output during the switch-on phase of a switching transistor.

FIG. 3 represents the voltage output 300 over time from a gate driver during the switch-on phase of a switching transistor. FIG. 3 illustrates three main parts of the switch-on operation. In phase 1 (301), the gate-source capacity of the transistor is loaded to the threshold value. During phase 2 (302), the Miller plateau is reached, and the resulting capacity strongly increases. At the beginning of phase 2, the gate current defines the slew rate of the current starting to flow through the transistor. In phase 3 (303), the gate continues loading until the maximum voltage of the driver circuit is reached.

The presence of a series resistance in the gate driver output increases the length of phase 1 (301), which represents the delay between the intended switch-on instant and the actual start of the gate current flow. Accordingly, it is desirable to keep phase 1 as short as possible. The transistor parameters that define the length of phase 1 vary from device to device and from type to type; however, once known, the gate capacity in phase 1 does not change significantly with other parameters, such as temperature and load current.

Several approaches are available to apply different gate currents during each phase. For example, the gate may be boosted with a high current during phase 1 and a lower current when starting phase 2. A key issue is to define and reproduce the length of phase 1. If the control mechanism does not stop applying a high current at the end of phase 1, the slew rate of the current through the switch becomes too high. If the control mechanism stops applying the high current too early, then switching time is wasted. Embodiments of the present invention adapt the current that is applied to the gate of the switching transistor to control the speed of the transistor.

Embodiments of the invention implement a boost mechanism for phase 1 that does not need a precise and fast detection mechanism. Instead, the embodiments use an indirect mechanism that automatically stops providing the boost on its own. The boost mechanism uses an indirect control parameter to avoid measuring gate voltage and to avoid the need for very fine time steps. Although the switch-on phase is described herein, the same mechanism may be used at the beginning of the switch-off phase to quickly discharge the gate to a desired value before applying a defined gate current.

In the present invention, a precharged capacitor is added in parallel to the gate-source capacitor during phase 1. The capacitive charge redistribution between both capacitors leads to a boost of the gate-source capacitor that automatically ends if both capacitors have reached the same voltage, which is slightly below the threshold voltage. The precharge voltage of the additional capacitor is controlled to reach the threshold voltage. The precharge voltage of the additional capacitor is easier to control than the gate source voltage itself. As a result, adjustment capability is available over a wider range and the desired precision can be achieved using the additional capacitor.

After phase 1, the additional capacitor is disconnected from the gate-source capacitor of the switching transistor. The additional capacitor may then be precharged for the next switch-on phase. This provides a longer time to control the desired precharge level. As noted above, the same mechanism may be used to reduce the delay for switching-off the switch transistor.

Figure 4:
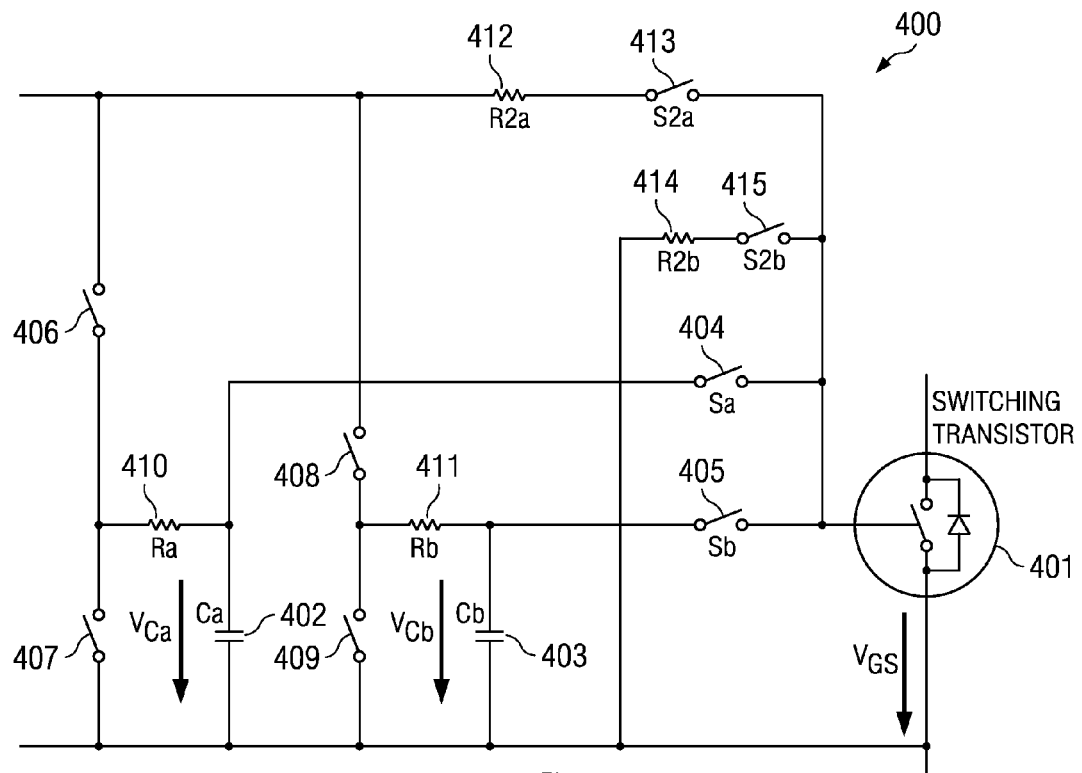
FIG. 4 is a schematic diagram of an exemplary embodiment of a boost mechanism.

FIG. 4 is a schematic diagram of an exemplary embodiment of the boost mechanism 400 coupled to switching transistor 401. Boost capacitor Ca 402 is used to boost the current to the gate of switching transistor 401 during a switch-on phase, and capacitor Cb 403 is used during the switch-off phase. In one embodiment, capacitor Ca 402 is precharged to a voltage value above the gate-source voltage of switching transistor 401, and capacitor Cb 403 is precharged to a voltage below the gate-source voltage. Switches Sa 404 and Sb 405 are connected to capacitors Ca 402 and Cb 403, respectively. Switch Sa 404 is closed during phase 1 of the switch-on phase to couple Ca 402 to the gate of switching transistor 401. In one embodiment, switch Sa 404 remains closed until the voltage across Ca 402 falls to or near the gate-source voltage and the charge distribution is complete.

Switch Sb 405 is closed during phase 1 of the switch-off phase to couple capacitor Cb 403 to the gate of switching transistor 401. In one embodiment, switch Sb 405 remains closed until the voltage across capacitor Cb 403 has risen to or near the desired gate-source voltage and the charge has been redistributed.

Switches 406-409 and resistances Ra 410 and Rb 411 are used to precharge the capacitors Ca 402 and Cb 403, respectively, to the desired voltages. After switch Sa 404 is opened at the end of phase 1 of the switch-on phase, switches 406 and 407 are open/closed as appropriate to recharge capacitor Ca 402 to the desired boost voltage. Similarly, after switch Sb 405 is opened at the end of phase 1 of the switch-off phase, switches 408 and 409 are open/closed as appropriate to recharge capacitor Cb 403 to the desired boost voltage. Capacitors Ca 402 and Cb 403 may be located inside or outside the gate driver circuit.

In one embodiment, resistance R2a 412 is coupled to the gate of switching transistor 401 via switch S2a 413 during phase 2 of the switch-on phase. In other embodiments, switch S2a 413 is also closed during phase 1 of the switch-on phase. Current is applied to the gate of switching transistor 401 across resistance R2a 412 during phase 2 of the switch-on phase and, in some embodiments, also during phase 1. Resistance R2b 414 and switch 415 operate similarly to resistance R2a 412 and switch 413 except during phase 2 (and possibly during phase 1) of the switch-off phase. In FIG. 4, only the switch-off to ground is shown. It is also possible in other embodiments to apply a negative voltage at the gate (if a negative power supply is available). Under some conditions a negative voltage is better than 0V, especially for fast transitions of the phase node.

The gate current may be adapted by adding a series resistance, such as R2a 412, between the output stage of the gate driver and gate of the switch. If the series resistance is too low, a current peak will occur, such as current peak 204 (FIG. 2). If the series resistance is too high, then the switching takes longer and switching losses occur. In known gate drivers, the gate current is adapted to a nominal load current and cannot be adjusted dynamically. As a result, a current peak appears for lesser load values, and switching losses increase for higher load values.

Referring again to FIG. 1, the blocking behavior of diode 104 depends upon the load current. The series resistance should be dynamically adapted to the actual load current to reduce EMI effects and switching losses. It is not easy to measure the load current and to adapt the gate current in a closed-loop structure. The value of the load current is not the only variable that defines switching behavior. Variations in switching transistor parameters also affect switching. One problem is that there is no direct access to these switching transistor parameters. The load current can only give an indication about the required or tolerated gate current.

Embodiments of the present invention dynamically adapt to the load current without knowing the transistor parameters to compensate for the effects of parameter variation. This is accomplished by analyzing the current gradient through the switch during the commutation phase. In particular, the falling or negative gradient of the switch current is taken into consideration.

Figure 5:
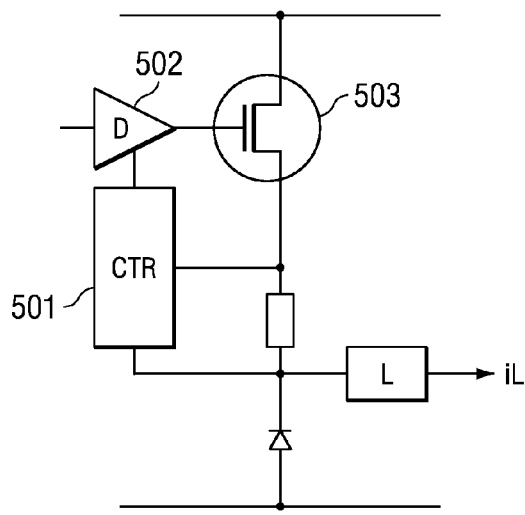
FIG. 5 illustrates an exemplary gate driver control according to one embodiment of the invention.

FIG. 5 illustrates an exemplary gate driver control circuit according to one embodiment of the invention. Current detection and control block 501 adapts the current capability of gate driver 502. A shunt is illustrated in FIG. 5, but other sensors, such as a Hall sensor or a Rogowski coil can be used. Control block 501 monitors the current through switch 503 during the commutation phase. A short measuring window that starts approximately with the activation of the driver is defined to ensure that only the commutation is taken into account.

Figure 6:
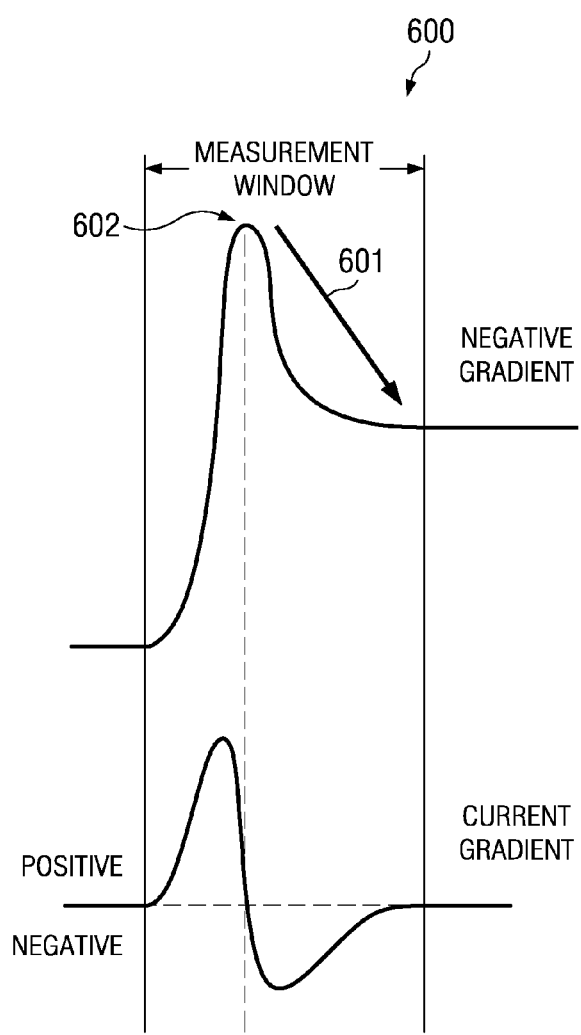
FIG. 6 illustrates a simple waveform of current through a switch during the commutation phase.

FIG. 6 illustrates a simple waveform 600 of the current through switch 503 during the commutation phase. In the present embodiment, negative gradient 601 is used to determine the presence and the size of current peak 602. In one embodiment, a peak and hold mechanism is used to detect the highest current value. The current at the end of the measurement window is the load current. The difference between the peak current and the load current (i.e. negative gradient 601) is the current peak amplitude.

Other methods can be used to analyze or detect the negative gradient. For example, in another embodiment, the negative values of the current gradient are integrated during the measurement window to get information about the peak current value.

The value of the negative gradient, which may be either explicitly measured or integrated, is compared to at least one reference level. If the value exceeds the reference level, then a current peak has been detected. If the value meets or is below the reference level, then the commutation phase was either perfectly matching or too slow. Depending upon the dynamics of the adjustment loop and/or to reduce noise effects, a low pass filter may be introduced between the measurement and application of the results to the system.

After each switching cycle, or at some other interval, the driver output current capability can be adapted based upon the results of the previous commutation phase. If a current peak is detected, such as when a negative gradient has a high value, the current capability may be decreased to reduce the switching speed of the switching transistor. If no current peak is detected, then the current capability may be increased to increase the switching speed and thereby reduce switching loss.

A second reference level may also be used. If the measurement is between both reference levels, then the current capability can be considered to be optimized and no adjustment is made. If the measurement is below both reference levels, then the current capability may be increased so that switching is faster. If the measurement is above both reference levels, then the current capability may be decreased to slow the switching speed and to reduce current peaks. An up/down counter may be used, for example, to select the current capability of the gate driver.

One advantage of embodiments of the invention is that the mechanism is self-adjusting to changing load current values. Additionally, the mechanism is not sensitive to parameter variations of the drivers and switches. Unlike other mechanisms used to adapt the current capability, the proposed system does not measure voltage derivatives of the load or the switch or the absolute current value. Instead, the system considers the relative changes of current through the switch during the commutation phase. Accordingly, the absolute value of the load current is not important to the operation of the system.

Figure 7:
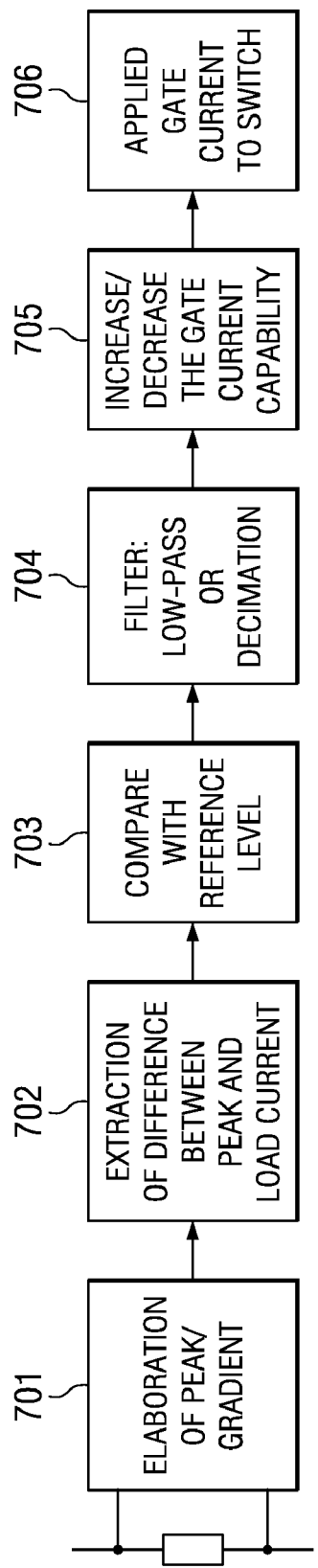
FIG. 7 is a flow chart illustrating one embodiment of a method according to the present invention.

FIG. 7 is a flow chart illustrating one embodiment of a method according to the present invention. In step 701, the peak current gradient is analyzed and a peak current and a load current are identified. In step 702, the difference between the peak current and the load current are determined. This current differential corresponds to the negative gradient that follows the current peak. In step 703, the current differential is compared to one or more reference levels. A low pass or decimation filter may be used in step 704 to eliminate noise or to adjust the dynamics of the feedback loop. In other embodiments, depending upon the algorithm being used, such as digital or analog implementations, step 704 may occur before step 703. The gate current capability is adjusted in step 705. If the current differential of the negative gradient was above the top reference level in step 703, then the gate current capability is decreased. If the current differential of the negative gradient was below the lower reference level in step 703, then the gate current capability is increased. If the current differential of the negative gradient was between reference levels in step 703, then the gate current capability may be maintained. In step 706, the adjusted gate current is applied to the switching transistor.

The inventive method disclosed herein may also be applied to adapt the precharge voltage of capacitor Ca 402 at a constant load current (series resistance unchanged). This learning phase could take place, for example, during a final test phase of the power inverter before delivery to the customer, and the required level may be defined by external components, such as resistors.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of adjusting a gate driver current, the method comprising:
    monitoring a current through a switching transistor to identify a peak current and a load current;
    determining a current differential between the peak current and the load current;
    comparing the current differential to one or more reference levels; and
    adjusting the gate driver current based upon a relationship of the current differential to the one or more reference levels.

2. The method of claim 1, wherein the current differential corresponds to a negative gradient in a current value over time.

3. The method of claim 1, further comprising:
    filtering results of the comparing before adjusting the gate driver current.

4. The method of claim 3, wherein the filtering is a low pass filter or a decimation filter.

5. The method of claim 1, further comprising:
    decreasing the gate driver current if the current differential is above a top reference level.

6. The method of claim 1, further comprising:
    increasing the gate driver current if the current differential is below a lower reference level.

7. The method of claim 1, further comprising:
    maintaining a current gate driver current if the current differential is between an upper reference level and a lower reference level.

8. The method of claim 1, wherein:
    monitoring the current comprises applying a measurement window to the current; and
    the load current comprises a value of the current at an end of the measurement window.

9. The method of claim 8, wherein the measurement window begins when activating the switching transistor.

10. The method of claim 1, further comprising activating the switching transistor, wherein activating the switching transistor comprises:
    precharging a boost capacitor to a voltage level above a gate-source voltage;
    coupling the boost capacitor to a gate of the switching transistor at the beginning of a switch-on phase; and
    decoupling the boost capacitor from the gate of the switching transistor when a boost capacitor voltage falls to or below the gate-source voltage.

11. The method of claim 10, further comprising:
    coupling a second-phase resistance between a supply voltage and the gate of the switching transistor, a value of the second-phase resistance based on the relationship of the current differential to the one or more reference levels.

12. A controller for a switching transistor, the controller comprising:
    a gate driver coupled to a control node, the control node configured to be coupled to a gate of the switching transistor; and
    a control block
        measuring a current though the switching transistor,
        determining a peak value of the current,
        determining a load value of the current,
        determining a current differential between the peak value and the load value,
        comparing the current differential to one or more reference levels, and
        adjusting the gate driver based on the comparing.

13. The controller of claim 12, wherein:
    the control block comprises a first measurement node and a second measurement node;
    the first measurement node is configured to be coupled to a first end of a resistor coupled in series with the switching transistor;
    the second measurement node is configured to be coupled to a second end of the resistor coupled in series with the switching transistor; and
    the control block measures the current through the switching transistor based on an electrical measurement of the first and second measurement nodes.

14. The controller of claim 12, wherein the control block comprises a filter to filter results of the comparing before adjusting the gate driver.

15. The controller of claim 14, wherein the filter comprises a low pass filter.

16. The controller of claim 12, wherein the controller decreases a drive strength of the gate driver if the current differential is above a first reference level and increases the drive strength of the gate driver if the current differential is below a second reference level.

17. The controller of claim 12, further comprising the switching transistor.

18. A method of operating a switching transistor, the method comprising:
    measuring a current of the switching transistor during a predetermined window time;
    determining a peak value of the current during the predetermined window time;
    determining a second value of the current at an end of the predetermined window time;
    determining a difference value between the peak value and the second value;
    comparing the difference value with a reference level; and
    adjusting a drive signal coupled to the switching transistor based on the comparing.

19. The method of claim 18, wherein measuring comprises using a Hall sensor.

20. The method of claim 18, further comprising adjusting the drive signal to decrease the current of the switching transistor if the difference value is greater than the reference level.

* * * * *